United States Patent [19]

Gray

[11] 4,300,540
[45] Nov. 17, 1981

[54] REFRIGERANT SOLAR ENERGY SYSTEM AND METHOD

[75] Inventor: Kenneth P. Gray, E. Syracuse, N.Y.

[73] Assignee: Carrier Corporation, Syracuse, N.Y.

[21] Appl. No.: 54,392

[22] Filed: Jul. 2, 1979

[51] Int. Cl.³ .......................... F24J 3/02; F28D 15/00
[52] U.S. Cl. ................................ 126/452; 165/104.25;
126/433; 417/377; 417/379; 417/401; 60/641.8
[58] Field of Search .................... 165/105, 1; 126/433,
126/452; 237/67, 59-63; 417/377, 379, 401;
60/641

[56] References Cited

U.S. PATENT DOCUMENTS

| | | | |
|---|---|---|---|
| 433,055 | 7/1890 | Tellier | 126/433 X |
| 795,761 | 7/1905 | Fulton . | |
| 2,195,293 | 3/1940 | Andersson | 62/333 X |
| 2,229,445 | 1/1941 | Fenander et al. | 62/333 X |
| 2,688,923 | 9/1954 | Bonaventura et al. . | |
| 3,937,599 | 2/1976 | Thureau et al. . | |
| 4,036,017 | 7/1977 | Siegel . | |
| 4,048,981 | 9/1977 | Hobbs . | |
| 4,061,131 | 12/1977 | Bohanon | 165/105 X |
| 4,068,476 | 1/1978 | Kelsey | 417/379 X |

*Primary Examiner*—Albert W. Davis
*Attorney, Agent, or Firm*—J. Raymond Curtin; Robert P. Hayter

[57] ABSTRACT

Apparatus and a method for utilizing energy from a high temperature source such as a solar collector to both provide heat energy to a low temperature source such as a body of water and to accomplish mechanical work utilizing a refrigerant motor. The refrigerant motor may be coupled to a pump for circulating refrigerant within a closed loop system such that the apparatus and method requires no power source other than the high temperature source.

14 Claims, 3 Drawing Figures

REFRIGERANT SOLAR ENERGY SYSTEM AND METHOD

BACKGROUND OF THE INVENTION

1. Field of the Invention

The present invention relates to a system for transferring energy from a high temperature source to a low temperature source and for simultaneously generating mechanical work. More specifically, the present invention concerns utilizing a closed circuit system having refrigerant as a working medium wherein refrigerant is vaporized at a high temperature source such as a solar collector and is condensed in a heat sink such as a body of fluid to be heated. The gaseous refrigerant flowing between the evaporator and the condenser of the system is used to power a refrigerant motor which converts energy from the refrigerant into mechanical work for use either as a pump within the system for circulating refrigerant or for some external motive requirement.

2. Description of the Prior Art

The present invention concerns a closed circuit refrigeration system wherein refrigerant is evaporated at a high temperature source to absorb heat and condensed at a low temperature source to reject heat. Therebetween energy from the gaseous refrigerant may be utilized in a refrigerant motor to provide mechanical work.

Prior art devices have utilized temperature differentials to provide motive source. Prior solar heaters have also used refrigerant including the change of state of the refrigerant for transferring heat energy. Additionally, solar energy has been utilized in various methods to provide pumping energy.

However, the herein apparatus utilizes a high temperature source to provide both energy for heat transfer and mechanical work by providing a refrigerant motor for mechanical work in combination with such a system and without a separate energy input.

More specifically, prior art systems have utilized the changing of location of a solar collector to provide for mechanical motion in combination with chambers which are heated and cooled through solar energy to provide for a solar energy pump. Low temperature and atmospheric motors utilizing temperature differentials have also been utilized. Refrigerant has been utilized to transfer heat from a high temperature to a low temperature source wherein the pressure generated by the evaporation of refrigerant at the high temperature source is utilized to create a flow through the system. Therein, there is no utilization of motor powered by refrigerant to provide mechanical work to power a pump for circulating refrigerant.

Other prior art includes utilizing a refrigerant system having a diaphragm to provide hydraulic pressure to a hydraulic circuit for operating a pump. However, this apparatus includes the use of the circulating pump having a power input from an external source for providing circulation of refrigerant therethrough. Other prior art devices have used refrigeration circuits to transfer heat between two heat sources with utilization of a mechanical pump supplied with electrical energy from an external source for circulating the heat exchange fluid.

The utilization of a refrigerant motor to provide for circulation of refrigerant in such a system may be advantageous since in a typical residential application the solar collectors are mounted on the roof of a residence and the hot water tank to which heat energy is rejected is located in the basement. A substantial head is created between the two elevations and a pump may be necessary to circulate refrigerant therebetween.

The herein invention utilizes the energy input to the refrigerant at the high temperature source such as a solar collector to vaporize refrigerant such that the energized refrigerant may be utilized to both drive a refrigerant motor for supplying mechanical work and to transfer heat energy to a lower temperature heat sink. The combination allows a solar energy system to be utilized without any external energy input. Such a system may be added to existing homes to provide heat energy on a basis of supplying such energy only when it is available. No internal energy is used for running circulating pumps or other devices such that the system may operate only when it is advantageous. Additionally, a system of this type may be utilized to convert heat energy into mechanical energy for accomplishing various purposes. These purposes might include operating a pump, generating electricity or operating a compressor of a separate vapor compression refrigeration system.

SUMMARY OF THE INVENTION

It is the object of this invention to provide a self-contained energy system for transferring energy from a high temperature source to a refrigerant motor and a low temperature sink. This combination allows for a self-contained solar energy unit which does not require any external power to effectively operate.

Another object of the present invention is to provide a safe, efficient, economical and reliable solar energy system which may be utilized on an energy available basis.

These and other objects are achieved according to the preferred embodiment of the present invention by the provision of an evaporator in heat exchange relation with a high temperature heat source such as a solar collector. Refrigerant is vaporized in an evaporator and conducted to a refrigerant motor wherein part of the energy of the refrigerant is utilized to provide mechanical work. Gaseous refrigerant at a lower energy level is discharged from the refrigerant motor to the condenser where it changes state rejecting heat to the fluid to be heated. The liquid refrigerant from the condenser is then conducted back to the evaporator wherein it is again vaporized to complete the cycle. Mechanical work generated by the refrigerant motor may be utilized to drive a pump for circulating liquid refrigerant back to the evaporator or other purposes external to the refrigeration circuit.

DESCRIPTION OF THE PREFERRED EMBODIMENT

The hereinafter described system will refer to utilizing heat energy collected in a solar collector to drive a refrigerant motor and to heat a body of water at a lower temperature. It is to be understood that the disclosed heat transfer system will have like applicability between any heat source and heat sink. It is to be further understood that utilization of a refrigerant motor to provide energy to other than a pump is also within the scope of this invention. Other high temperature sources such as process water, geothermal, waste heat and exhaust gases may be utilized to provide the necessary energy input to such a system. It is also to be understood that various types of refrigerant motors may be used in the described systems.

Figure 1:
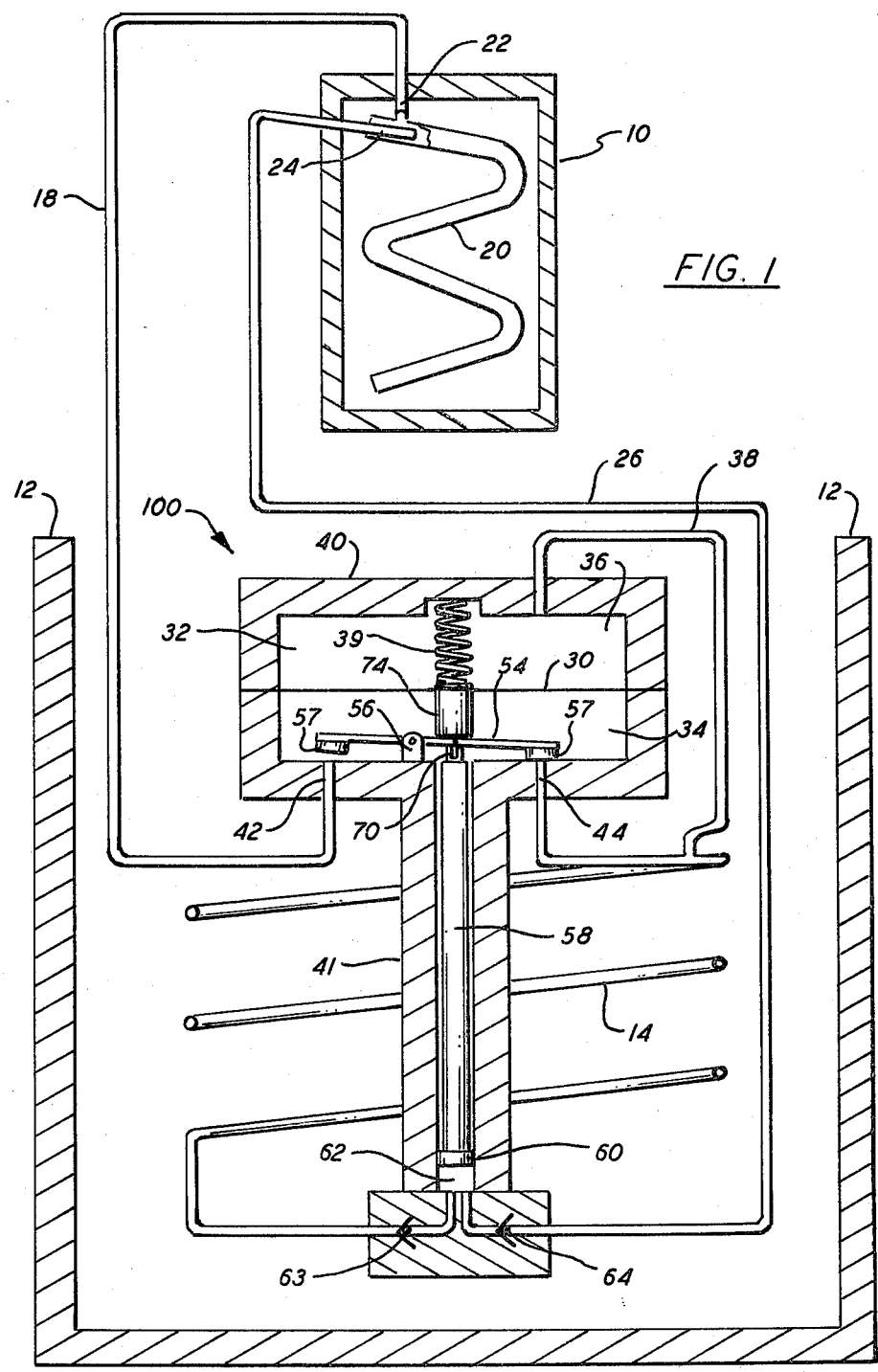
FIG. 1 is a schematic drawing of a refrigerant and solar energy system showing a solar collector with an evaporator mounted therein, a condenser mounted within a container containing a fluid to be heated and a refrigerant motor and pump.

Referring now to FIG. 1 it can be seen that evaporator 20 is serpentine in configuration and mounted within solar collector 10. Solar collector 10 receives the sun's rays as is well known in the art to generate a relatively high temperature level within the collector. Evaporator 20 is mounted within the collector in heat exchange relation with the air or other fluid contained therein such that heat energy is transferred from the collector to the refrigerant within the evaporator. Evaporator 20 has an evaporator gas discharge outlet 22 at the top thereof and an evaporator liquid inlet 24 also entering the top thereof. Typically, the solar collector is inclined at an angle from horizontal equal to the latitude of the collector location to optimize the exposure and the collection to solar energy. The evaporator within the collector is also inclined such that the liquid refrigerant collects in the bottom thereof and the vaporized refrigerant flows upwardly out the top. The provision of an evaporator liquid inlet at the top of the evaporator provides for a counterflow relation along the serpentine length of the evaporator such that as the liquid flows downwardly by gravity hot gas flows upwardly and energy is effectively transferred between the two flows to promote the vaporization of liquid refrigerant.

Vapor line 18 is connected to evaporator gas discharge outlet 22 and to entry port 42 of casing 40 of the refrigerant motor. Liquid line 26 connects condenser 14 through the pump to evaporator inlet 24.

Refrigerant motor 100 has a casing 40 which defines chamber 32. Diaphragm 30 divides chamber 32 into driving chamber 34 and equalizing chamber 36. Entry port 42 passes through casing 40 to allow vaporized refrigerant from line 18 to enter the driving chamber 34 of refrigerant motor. Discharge port 44 is also formed through casing 40 to allow gaseous refrigerant from driving chamber 34 to be discharged into condenser 14. Bypass line 38 is provided for equalizing the pressure between the equalizing chamber 36 and the condenser 14. Mounted within driving chamber 34 is rocker arm 54. Rocker arm 54 is supported by pivotal support 56 intermediate the ends thereof. Rocker arm 54 has valve seats 57 located on either end, one for covering entry port 42 and one for covering discharge port 44. As shown in FIG. 1, the physical dimensions of the clearance space between the ports and their corresponding valve seats are exaggerated. In actuality, the relative displacement of the rocker arm to cover one port and open the other and vice versa is minimal.

Rocker arm 54 is connected by a pin extending through slot 70 to rod 58. Plug 74, a portion of rod 58, extends downwardly from diaphragm 30. Spring 39 is attached to the opposite side of diaphragm 30 from plug 74 and to casing 40. Rod 58 has formed therein slot 70 which the pin extending from rocker arm 54 rides. Piston 60 is attached to one end of rod 58. Rod 58 and piston 60 travel up and down with the motion of diaphragm 30 within casing extension 41. Piston 60 reciprocates within pump cavity 62 for pumping liquid refrigerant out of condenser 14 back to evaporator 20. Check valves 63 and 64 are provided within condenser 14 and liquid line 26 such that the refrigerant is pumped by the appropriate reciprocating motion of piston 60.

OPERATION

When a high temperature source is available, liquid refrigerant is vaporized in the evaporator providing a gas at relatively higher temperature and pressure as well as higher internal energy. This gas is allowed to enter driving chamber 34 when the rocker arm is in the position shown in FIG. 1. Since discharge port 44 is closed, refrigerant entering the driving chamber acts to expand the chamber displacing diaphragm 30 upwardly. As diaphragm 30 is moved upwardly rod 58 and plug 74 attached to rod 58 move upwardly together with piston 60 drawing liquid refrigerant from condenser 14. When diaphragm 30 is displaced sufficiently rod 58 is also displaced and pin 72 extending from rocker arm 54 (better seen in FIG. 2) engages the rod at the end portion of slot 70 such that the rocker arm is moved upwardly with the rod acting to alter the rocker arm position such that entry port 42 is closed and discharge port 44 is opened. Spring 39 which has been compressed during the expansion of diaphragm 30 now acts to force diaphragm 30 back to the neutral position and to force the gaseous refrigerant within driving chamber 34 through discharge port 44 to condenser 14. As the diaphragm moves downwardly as a result of the spring force of spring 39 the top surface of the slot of the rod eventually contacts the pin extending from the rocker arm forcing the rocker arm to rotate clockwise closing discharge port 44 and opening entry port 42 completing the cycle. As the spring is driving the rod downwardly piston 60 forces liquid refrigerant through check valve 64 and liquid line 26 back to the evaporator. Check valve 63 prevents refrigerant flow in the opposite direction. A snap action device such as an overcenter spring may be utilized in conjunction with rocker arm 54 to provide for immediate response between the entry port open and discharge port closed versus entry port closed and discharge port open positions.

Bypass line 38 acts to equalize the pressure between condenser 14 and equalizing chamber 36. Consequently, the pressure in equalizing chamber 36 may be controlled to be that of the condenser such that the necessary energy to move the diaphragm is relatively independent of the ambient temperature and other system temperatures such as condenser and evaporator temperatures.

The entire refrigerant motor 100 and condenser 14 as well as piston 60 are all shown in FIG. 1 located within container 12. In actual operating conditions container 12 might well be a hot water tank filled with fluid such that heat energy of the motor, piston and condenser are all transferred to the fluid within the container.

Figure 2:
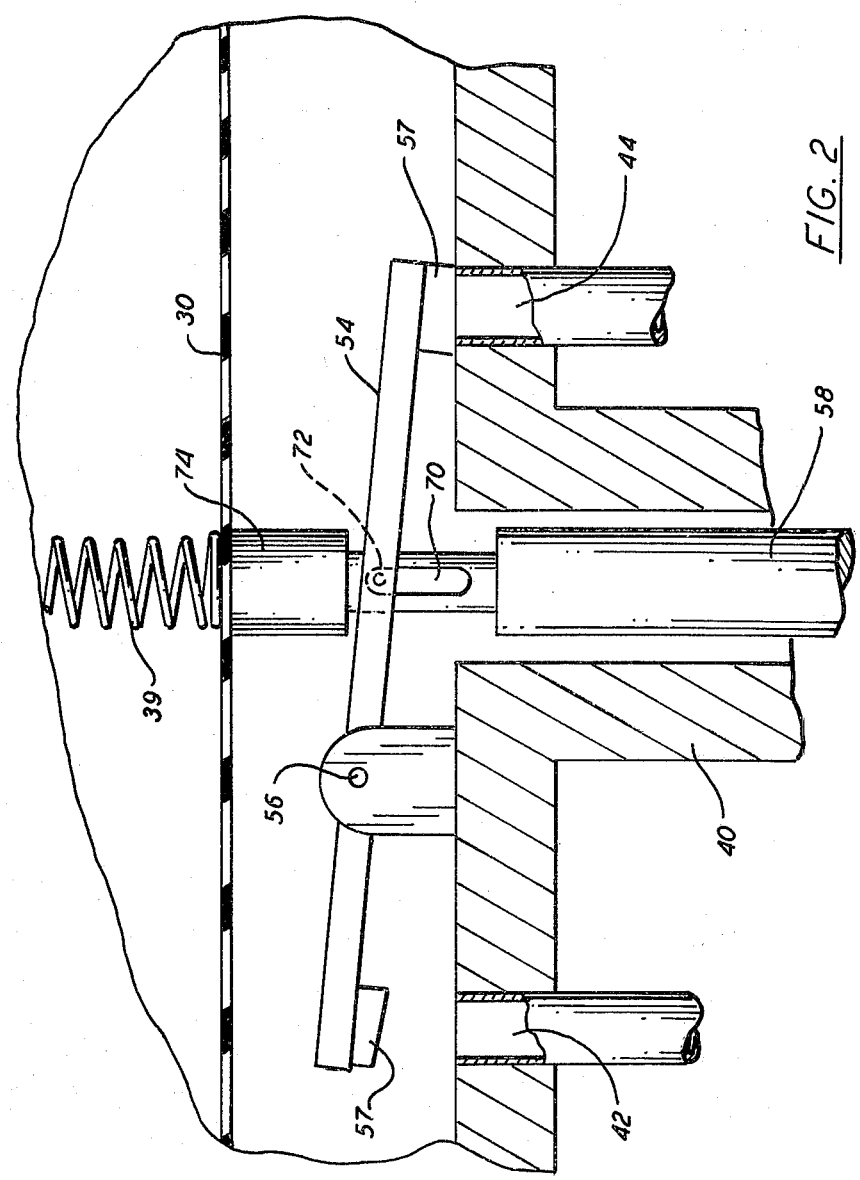
FIG. 2 is an enlarged portion of FIG. 1 showing details of the refrigerant motor.

FIG. 2 is an enlarged view of the refrigerant motor rocker arm and rod mechanism of the pump to show the interrelation thereof. Slot 70 and rocker arm pin 72 extending from the rocker arm through the slot may be better seen therein.

ALTERNATIVE EMBODIMENT

Figure 3:
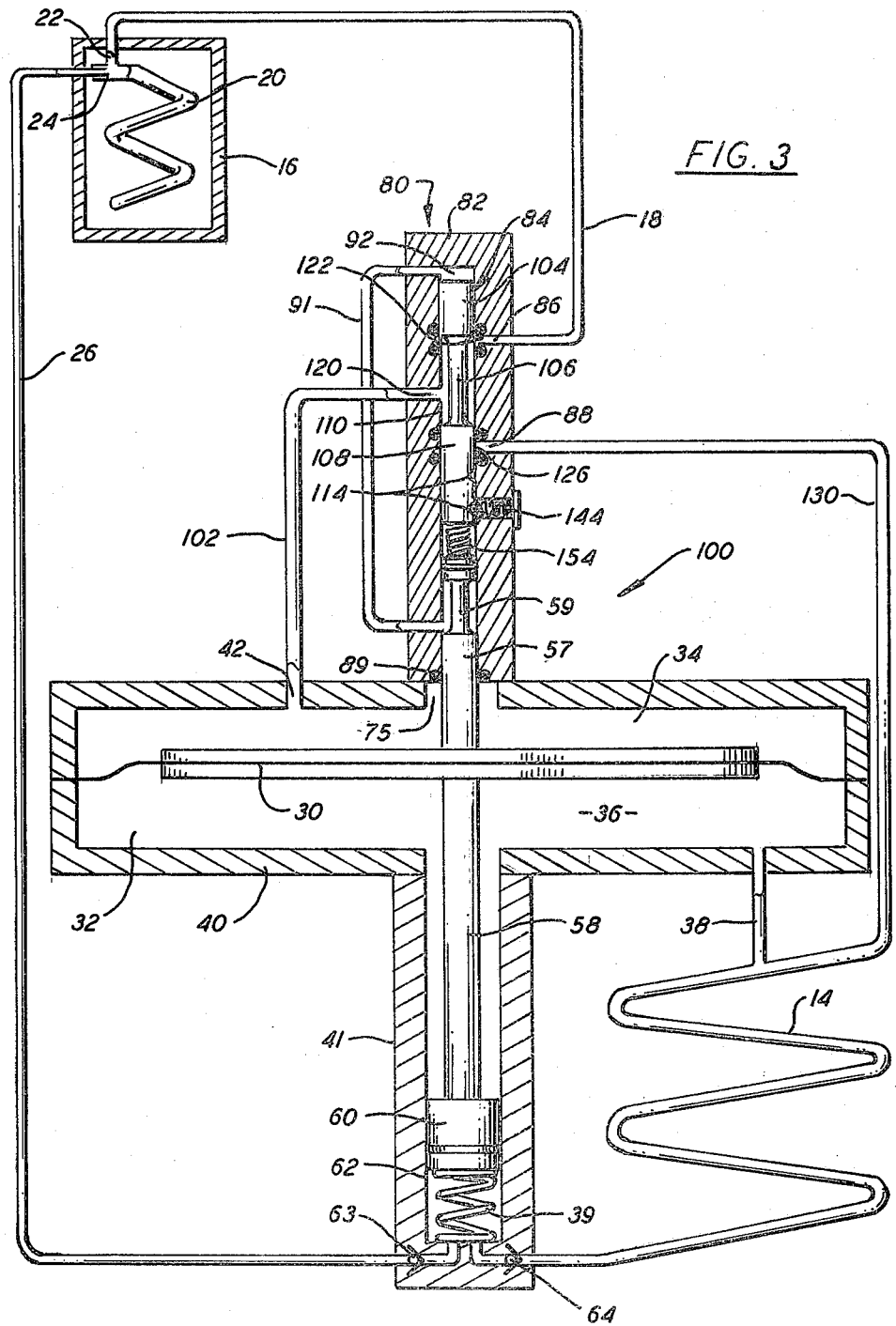
FIG. 3 is a schematic view of a refrigeration circuit having another embodiment of the refrigerant motor.

In FIG. 3 it can be seen that refrigerant is vaporized in evaporator 20 located within solar collector 16. This gaseous refrigerant is conducted through vapor line 18 to spool valve 80 and enters said valve through valve casing 82 at vapor line inlet 86. Liquid refrigerant enters evaporator 20 through evaporator inlet 24 connected to liquid line 26.

The refrigerant motor has chamber 32 defined by casing 40. Diaphragm 30 divides chamber 32 into equalizing chamber 36 and driving chamber 34. Connected to diaphragm 30 are rod 58 and valve actuator 57. Rod 58 is located to reciprocate within casing extension 41 and is connected to piston 60 which reciprocates within piston cavity 62. Spring 39 is mounted within piston cavity 62 to bias the diaphragm toward the reduction of volume of driving chamber 34. Check valves 63 and 64 are provided to allow for pumping action with the piston. The valving arrangement with the piston could provide for pumping in both directions of motion of the piston.

Connected to spool valve 80 is vapor line extension 130 at vapor line outlet 88. Vapor line extension 130 conducts refrigerant to condenser 14. Bypass line 38 also communicates equalizing chambers 36 with condenser 14. Additionally, connecting line 102 communicates spool valve 80 through common valve port 120 to the driving chamber 34 of the motor at port 42. Casing 40 additionally has dicharge port 75 extending therethrough at the point where valve actuator 57 reciprocates. Mounted within spool valve 80 and within valve chamber 110 is spool 84. Spool 84 has a spool end 104, spool middle of reduced diameter 106 and spool end 108. Located within spool end 108 are detent notches 114. Detent spring 144 is located through spool valve casing 82 to engage detent openings 114 of the spool valve. Valve actuator 57 extends through sealing ring 89 into valve chamber 110 of the spool valve. Valve actuator 57 has spool portion 59 at the end thereof. Spool portion 59 is of lesser diameter than the diameter of the valve chamber. Pilot line 91 communicates pilot chamber 92, a portion of valve chamber 110, with a bottom portion of valve chamber 110 adjacent the valve actuator. Spring 154 is provided between spool 84 and valve actuator 59.

OPERATION

When vaporized refrigerant is supplied through vapor line 18 and the spool valve is in the position shown in FIG. 3 gaseous refrigerant travels through vapor line 18 through vapor line inlet 86 through the valve chamber at the spool middle portion 106 and is discharged out common valve port 120 through connecting line 102 through port 42 to the driving chamber 34 of the motor. As gas follows this path the diaphragm is displaced downwardly moving both valve actuator 57 and rod 58. Downward displacement of rod 58 forces piston 60 downwardly against spring 39 forcing liquid refrigerant through liquid line 26 back to evaporator 24.

Upon the diaphragm being sufficiently displaced spool portion 59 of the valve actuator communicates (through discharge port 75) driving chamber 34 to pilot chamber 92 through pilot line 91. Gaseous refrigerant then flows through the discharge port through the pilot line and into the pilot chamber 92 forcing the valve spool 80 to move downwardly blocking the flow of refrigerant gas into the spool valve through vapor line 18 and further serving to communicate connecting line 102 through common valve port 120 to the vapor line outlet 88 and vapor line extension 130. Additionally, detent spring 144 is dislodged such that the detent spring engages the second of the two detent openings 114 to secure the spool in this second position. In this position the refrigerant gas trapped in driving chamber 34 is discharged as a result of the force applied by spring 39 to diaphragm through port 42 connecting line 104, valve port 120, chamber 110 about the middle portion 106 of the spool through the vapor line outlet 88 into vapor line extension 130 and eventually condenser 14. Refrigerant flow out discharge port 75 through pilot line 91 to the pilot chamber is prevented as the diaphragm moves upwardly and spool portion 59 of valve actuator 57 moves through sealing ring 89 such that there is no communication between discharge port 75 and the pilot chamber. Upon diaphragm 30 returning to its original position the spool portion 59 of valve actuator 57 engages the bottom of spool end 108 of the spool valve and displaces same upwardly. Once the mechanical engagement displaces the valve upwardly, spring 154 acts to continue the displacement upwardly of the spool until detent spring 144 engages the first detent opening 114 securing the spool in the first position. Refrigerant gas may now flow as originally described and the cycle has been completed.

It is to be understood that this refrigerant motor may be utilized to operate a compressor of a refrigeration system, an electrical generator or a water pump or other type pump rather than a pump circulating refrigerant.

The herein invention has been described with reference to a particular embodiment. It is to be understood that modifications and variations can be made within the spirit and the scope of the invention. Additionally, reference is hereby made to patent application entitled "Refrigerant Motor" filed simultaneously herewith for a better description of the details of refrigerant motor embodiments.

I claim:

1. A system for transferring heat energy from a source at high temperature to a body of fluid of relatively low temperature comprising:
   a refrigerant as a working fluid;
   an evaporator in heat exchange relation with the source;
   a condenser;
   a vapor line connecting the evaporator to the condenser;
   a liquid line connecting the condenser to the evaporator;
   a pump connected to circulate liquid refrigerant flowing through the liquid line to the evaporator;
   a refrigerant motor operated with energy contained by the refrigerant for powering said pump; and
   wherein the condenser, pump and motor are in heat exchange relation with said body of fluid.

2. The apparatus as set forth in claim 1 wherein the condenser pump and motor are all immersed within said body of fluid.

3. The apparatus as set forth in claim 1 wherein the source of high temperature is a solar collector.

4. The apparatus as set forth in claim 1 wherein the refrigerant motor receives gaseous refrigerant at a first temperature and discharges said refrigerant at a second lower temperature utilizing the energy difference between the entry and discharge of the refrigerant to accomplish work.

5. The apparatus as set forth in claim 4 wherein the refrigerant motor has an oscillating diaphragm and wherein the pump has a piston connected to the diaphragm for reciprocating motion.

6. Apparatus for heating a fluid with solar energy utilizing refrigerant as a working medium which comprises:
- a solar collector including an evaporator wherein liquid refrigerant is vaporized absorbing heat energy;
- a heating device having a condenser wherein gaseous refrigerant is converted to liquid refrigerant rejecting heat energy to the fluid to be heated;
- a pump for circulating refrigerant from the condenser to the collector, said pump being in heat exchange relation with the fluid to be heated;
- a liquid line connecting the condenser to the evaporator of the collector;
- a vapor line connecting the evaporator of the collector to the heating device; and
- a refrigerant operated motor for supplying power to said pump, said motor receiving gaseous refrigerant from the collector and discharging gaseous refrigerant to the condenser and said motor being in heat exchange relation with the fluid to be heated.

7. The apparatus as set forth in claim 6 wherein the heating device, pump and the motor are all immersed in the fluid to be heated.

8. The apparatus as set forth in claim 6 wherein the pump comprises a reciprocating piston and wherein the refrigerant motor is connected to the pump causing the piston to reciprocate.

9. The apparatus as set forth in claim 6 wherein the evaporator comprises a heat transfer tube mounted within the solar collector and has a gaseous outlet connected to the top thereof and a liquid inlet also connected to the top portion of the evaporator such that liquid refrigerant from the condenser flows downwardly through the tube and collects at the bottom thereof while gaseous refrigerant flows upwardly out the gas outlet.

10. Apparatus for converting solar energy into mechanical work and heat energy which comprises:
- solar collector means;
- a container having a fluid for absorbing heat energy;
- a closed circuit system utilizing refrigerant as an energy transfer medium including;
  - a. an evaporator mounted in heat exchange relation with the solar collector;
  - b. a condenser mounted in heat exchange relation with the fluid in the container;
  - c. a liquid line connecting the condenser to the evaporator;
  - d. a vapor line connecting the evaporator to the condenser;
  - e. a pump located in the liquid line for circulating the refrigerant through the closed circuit, said refrigerant absorbing heat energy from the solar collector and rejecting heat energy to the fluid in the container; and
- a refrigerant powered motor connected to the pump for converting a portion of the energy of the gaseous refrigerant to mechanical work, said motor and said pump being located in heat exchange relation with the fluid in the container.

11. The apparatus as set forth in claim 10 wherein the motor is connected to receive gaseous refrigerant from the evaporator and to discharge gaseous refrigerant to the condenser.

12. The apparatus as set forth in claim 10 wherein the condenser, pump and motor are immersed in the fluid of the container.

13. A method of utilizing solar energy to heat a fluid at a distant location and to accomplish mechanical work which comprises the steps of;
- vaporizing a refrigerant in heat exchange relation with the solar energy collector;
- conducting the vaporized refrigerant to the fluid to be heated at a distant location;
- condensing the refrigerant in heat exchange relation with the fluid to be heated rejecting heat to said fluid;
- conducting liquid refrigerant back to the step of vaporizing to complete a refrigerant circuit;
- pumping the refrigerant mechanically to assure flow through the circuit;
- converting a portion of the energy contained in the refrigerant to mechanical work with a refrigerant motor; and
- performing the steps of pumping and converting in heat exchange relation with the fluid to be heated.

14. A method as set forth in claim 13 wherein the step of converting includes mechanically coupling the refrigerant motor to supply the necessary work to the step of pumping.

* * * * *